(12) United States Patent
Chen et al.

(10) Patent No.: US 8,526,516 B2
(45) Date of Patent: Sep. 3, 2013

(54) SYSTEMS AND METHODS FOR MULTIPLE-INPUT MULTIPLE-OUTPUT COMMUNICATIONS SYSTEMS

(75) Inventors: Cheng-Ming Chen, Hsinchu (TW); Jen-Yuan Hsu, Jincheng Township (TW); Pang-An Ting, Fongyuan (TW); Chih-Yu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 957 days.

(21) Appl. No.: 12/432,309

(22) Filed: Apr. 29, 2009

(65) Prior Publication Data

US 2009/0279631 A1    Nov. 12, 2009

Related U.S. Application Data

(60) Provisional application No. 61/050,966, filed on May 6, 2008, provisional application No. 61/105,923, filed on Oct. 16, 2008.

(51) Int. Cl.
    *H04L 27/28*    (2006.01)
(52) U.S. Cl.
    USPC ......................................................... 375/260

(58) Field of Classification Search
    USPC .................................................. 375/260, 346
    See application file for complete search history.

(56) References Cited

U.S. PATENT DOCUMENTS

| 7,450,661 B2 * | 11/2008 | Jeong et al. .................... 375/299 |
| 7,697,948 B2 * | 4/2010 | Wan et al. ...................... 455/509 |
| 2007/0049317 A1 | 3/2007 | Qi et al. |
| 2007/0153928 A1 * | 7/2007 | Liu et al. ........................ 375/260 |
| 2007/0245205 A1 | 10/2007 | Popovski et al. |

* cited by examiner

*Primary Examiner* — Kevin Kim
(74) *Attorney, Agent, or Firm* — Finnegan, Henderson, Farabow, Garrett & Dunner, LLP

(57) ABSTRACT

In a multiple input multiple output (MIMO) wireless communication system, there is provided a method for error correction. The method includes receiving an original signal in an initial MIMO format, detecting an error in the original signal, and notifying a transmitter of the error detected in the original signal. The method also includes receiving a new retransmitted signal in a first retransmitted MIMO format, different from the initial MIMO format, the new retransmitted signal including at least a fraction of encoded bits of the original signal. The method also includes correcting the original signal by applying the new retransmitted signal to the original signal.

27 Claims, 12 Drawing Sheets

SYSTEMS AND METHODS FOR MULTIPLE-INPUT MULTIPLE-OUTPUT COMMUNICATIONS SYSTEMS

RELATED APPLICATIONS

This application claims benefit from Provisional Application No. 61/050,966 filed May 6, 2008, and Provisional Application No. 61/105,923 filed Oct. 16, 2008, the contents of which are incorporated in their entirety by reference.

FIELD OF THE INVENTION

This invention relates to systems and methods for error correction.

BACKGROUND OF THE INVENTION

Wireless communication systems may use either Single Input Single Output (SISO) configurations or Multiple Input Multiple Output (MIMO) configurations. SISO systems include a single antenna at the transmitter and a single antenna at the receiver. By contrast, MIMO systems include multiple antennae at the transmitter, and multiple antennae at the receiver. The additional antennae may have features for signal transmission and reception.

For example, the MIMO system may employ Spatial Multiplexing (SM), which enables the MIMO system to transmit different signals on different antennae. SM enables the MIMO system to generally provide greater throughput, because more signals are transmitted at a particular time and/or frequency over the multiple antennae. A MIMO system may transmit additional SM signals at a subsequent time and/or at a different frequency unit. However, when using SM, multiple signals may interfere with each other at the receiver, especially in a highly correlated channel.

As another example, the MIMO system may also employ Space Time Block Coding (STBC), which enables the MIMO system to transmit a space-time coded signal over multiple antennae during a time interval. In other words, the space-time coded signal includes multiple redundant signals that are each transmitted over a different antenna. In this way, if one of the signals is corrupted before it reaches the receiver, a duplicate signal that is transmitted from a different antenna is available to correct or replace the corrupted signal. This is called "diversity." Moreover, unlike SM, even if the signals are transmitted simultaneously (i.e., at the same time and/or frequency unit), there is no interference at the receiver. This is because the space-time coded signal is orthogonal. In other words, the redundant signals which are part of the space-time coded signal are orthogonal to each other. Therefore, when the redundant signals are received at the receiver, there is no interference.

As yet another example, the MIMO system may also employ Space Frequency Block Coding (SFBC), which enables the MIMO system to transmit the same signal over multiple antennae at a given time, just as STBC. SFBC is similar to STBC in that it is transmitted orthogonally. However, SFBC differs from STBC, in that it sends different signals over different frequency sub-carriers, instead of at later points in time. Accordingly, SFBC enables MIMO to send redundant copies of the signal, along with different signals, all at the same time. As demonstrated by these examples, the use of MIMO can be beneficial.

At the receiver, the MIMO signal is decoded. There are different decoders that may be used to decode the MIMO signal. If the signals are encoded orthogonally, i.e., as STBC or SFBC, there will be no interference for each signal, and a maximum ratio combining (MRC) detector can be employed at the receiver. However, if the signals are not encoded orthogonally, i.e., as SM, then the signals may interfere with each other, and a minimum mean square error (MMSE) or maximum likelihood (ML) detector can be employed at the receiver. Of the three detectors, MRC is simpler than MMSE, and ML requires the largest computational effort.

An optimal decoder to use in any given situation depends on the format of the transmit signal. The optimal decoder is one that produces a decoded signal that reaches the ML, and known as the best solution. For SM formatted transmit signals, the optimal detector may be the ML detector. For STBC/SFBC formatted transmit signals, the optimal detector may be the MRC detector, as the solution to the MRC is already a ML solution. The reason that STBC/SFBC may be compatible with the simpler MRC detector, is because the orthogonal encoding of the symbols in STBC/SFBC cancels the interference among the different signals. However, this is only true given the assumption that a subsequent channel (whether in time or frequency) is slowly or nearly time invariant. In other words, the assumption is that the subsequent channel does not change (or changes very little) according to time or frequency.

To increase reliability, both SISO and MIMO systems may employ a Hybrid Automatic Retransmission Request (HARQ). With HARQ, the receiver performs a cyclic redundancy check (CRC) on the received signal. If the result of the CRC is positive, then the receiver sends an acknowledgement (ACE) to the transmitter. However, if the result of the CRC is negative, the receiver sends a negative acknowledgement (NACK) to the transmitter. After the transmitter receives the NACK, it retransmits at least a portion of the original signal to the receiver, so that the receiver can correct the error in the previously received original signal.

When signals are retransmitted using HARQ, the receiver must combine the retransmitted signal with the original signal in order to correct the error. There are two primary schemes by which to combine these signals. First, the receiver may use bit level combining, whereby the receiver combines the signals at the bit level. Second, the receiver may use symbol level combining, whereby the receiver combines the signals at the symbol level. The symbol is a constellation point mapping of a collection of bits. As used here, a symbol is a representation of a unit of data. Whether using bit level combining or symbol level combining, an initially transmitted signal may be encoded using SM. Moreover, conventional MIMO HARQ systems retransmit the same SM signal when an error is found in the initially transmitted signal. The retransmitted signal may be combined with the initially transmitted signal at the receiver at the bit level. Alternatively, the retransmitted signal may be combined with the initially transmitted signal at the receiver at the symbol level, for example with a joint MMSE detector, and the MMSE detector as discussed above.

In SISO systems, bit level combining and symbol level combining do not differ significantly with respect to performance. However, in MIMO systems, when using the conventional retransmitted SM pattern, using symbol level combining improves the combination performance as compared to bit level combining. This is because a better conditioned equivalent channel may be obtained before detection when using symbol level combining. A channel may be well-conditioned when columns of the channel are substantially orthogonal to each other. In this way, the interference between SM signals can be fully eliminated.

However, symbol level combining has some drawbacks and restrictions. First, symbol level combining consumes more buffer space in the receiver as compared to other methods of combining in the receiver. Reducing buffer consumption may be desirable in MIMO systems, especially when implementing system on a chip (SoC) design. A second drawback is that the retransmitted bits should be aligned in symbol mapping with respect to that of the original transmission. In other words the constellation signal should be aligned to permit the same constellation points. Third, symbol level combining may consume more computation power than other methods of combining. Regardless of whether symbol level combining or bit level combining is used at the receiving side, both the initial packet and the retransmitted packet are customarily sent using the same MIMO pattern format.

SUMMARY OF THE INVENTION

According to a first aspect of the present disclosure, there is provided, in a multiple input multiple output (MIMO) wireless communication system, a method for error correction, comprising: receiving an original signal in an initial MIMO format; detecting an error in the original signal; notifying a transmitter of the error detected in the original signal; receiving a new retransmitted signal in a first retransmitted MIMO format, different from the initial MIMO format, the new retransmitted signal including at least a fraction of encoded bits of the original signal; and correcting the original signal by applying the new retransmitted signal to the original signal.

According to a second aspect of the present disclosure, there is further provided at least one computer-readable medium including program instructions which, when executed by at least one processor, cause the at least one processor to perform a method for error correction in a multiple input multiple output (MIMO) wireless communication system, the method comprising: receiving an original signal in an initial MIMO format; detecting an error in the original signal; notifying a transmitter of the error detected in the original signal; receiving a new retransmitted signal in a first retransmitted MIMO format, different from the initial MIMO format, the new retransmitted signal including at least a fraction of encoded bits of the original signal; and correcting the original signal by applying the new retransmitted signal to the original signal.

According to a third aspect of the present disclosure, there is still further provided a multiple input multiple output (MIMO) wireless communication system for error correction, the system comprising: antennae configured to receive an original signal in an initial MIMO format, notify a transmitter of an error in the original signal, and receive a new retransmitted signal in a first retransmitted MIMO format different from the initial MIMO format, the new retransmitted signal including at least a fraction of encoded bits of the original signal; and a processor configured to detect the error in the original signal and to correct the original signal by applying the new retransmitted signal to the original signal.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

As discussed above, whether symbol level combining or bit level combining is used at the receiving side, both the initial packet and the retransmitted packet are customarily sent using the same MIMO pattern format. However, in embodiments disclosed herein, the retransmitted packet can be in any MIMO format, including a MIMO format that is different than the MIMO format used for the initial packet. Generally, a later retransmission MIMO format can be different than an earlier transmission or retransmission. For example, a first ($1^{st}$) retransmission may be of a different format than an initial ($0^{th}$) transmission. Furthermore, a second ($2^{nd}$) retransmission may be of a different format than the initial $0^{th}$ transmission and/or different than the $1^{st}$ retransmission. Moreover, the MIMO pattern format can be any kind of MIMO encoding scheme, for example, single-user MIMO, multi-user MIMO, open-loop MIMO, closed-loop MIMO, SM, STBC/SFBC and their combinations.

As also discussed above, there are different benefits and drawback to using symbol level combining. Although a better condition number (indicating a better conditioned channel) can be obtained by symbol level combining, it may be beneficial to use alternative ways to enhance the performance of bit level combining, in order to avoid the drawbacks of symbol level combining. The alternative ways of enhancing the performance of bit level combining may include constellation re-arrangement or random pre-coding.

In disclosed embodiments, it may be beneficial to send the retransmitted packet using a different MIMO format, for example, if the condition number of a retransmission using the original MIMO format is poor. For example, when using bit level combining (which generally has a lower condition number than joint symbol level combining), using a different MIMO format may be desirable. In this way, the advantages of bit level combining may be achieved while compensating for the lower condition number.

Figure 1:
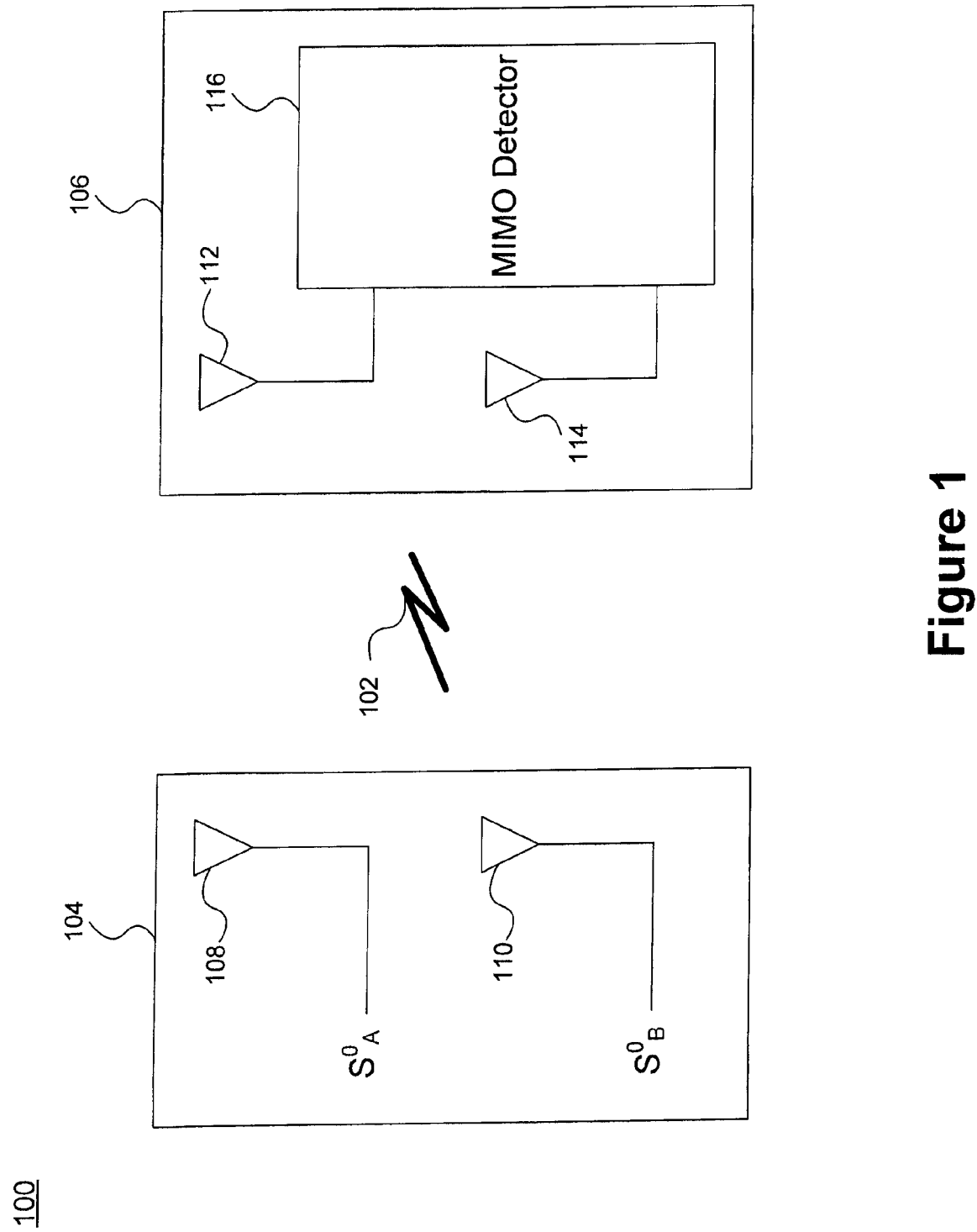
FIG. 1 illustrates a block diagram of a $0^{th}$ transmission in a communication system.

FIG. 1 illustrates a block diagram of an initial $0^{th}$ transmission in a MIMO communication system 100. MIMO communication system 100 may include a signal 102, MIMO transmitter 104, and MIMO receiver 106. The initial $0^{th}$ transmission may be an original transmission of signals $s_A^0$ and $s_B^0$ as signal 102, from MIMO transmitter 104 to MIMO receiver 106. MIMO transmitter 104 may include an antenna 108 and an antenna 110. Moreover, MIMO transmitter 104 may include additional antenna (not shown). MIMO transmitter 104 may send signal $s_A^0$ on antenna 108, and signal $s_B^0$ on antenna 110. In a general representation $s_m^t$ of the signals $s_A^0$ and $s_B^0$ being transmitted, t and m represent the t-th transmission and m-th constellation signal, respectively. MIMO receiver 106 may include an antenna 112 and an antenna 114. Moreover, MIMO receiver 106 may include additional antenna (not shown). MIMO receiver 106 may receive signal 102 at antenna 112, and/or an antenna 114, and/or at any additional antennae. Signal 102 may then be processed by a linear minimum mean square error (MMSE) estimator MIMO detector 116 to detect the transmitted signals, and calculate relative soft gains. Block diagram 100 may implement the original signal transmission according to the following equation:

$$y^0 = Hs^0 + n \qquad (1)$$

where $y^0$ is the received signal for the 0-th transmission, H is the MIMO channel between MIMO transmitter 104 and MIMO receiver 106, $s^0$ is the signal 102 for the 0-th transmission, and n is a noise and interference vector. Equation (1) can also be written in expanded matrix form:

$$y^0 = \begin{bmatrix} h_{00} & h_{01} \\ h_{10} & h_{11} \end{bmatrix} \begin{bmatrix} s_A^0 \\ s_B^0 \end{bmatrix} + n. \qquad (2)$$

After the initial $0^{th}$ transmission is received, MIMO receiver 106 may perform a CRC check on signals $s_A^0$ and $s_B^0$. In this example, MIMO receiver 106 may determine that there is an error in the received signal $y^0$ which includes $s_A^0$ and $s_B^0$. Upon making the determination that there is an error in the received signal $y^0$, in accordance with HARQ as discussed above, MIMO receiver 106 may send a NACK to MIMO transmitter 104. In response, MIMO transmitter 104 may retransmit a partial signal of the original packet, for example $s_A^0$ in the next transmission.

In this example, the retransmission retransmits signal $s_A^0$, as $s_A^1$, (with the 1 in the superscript corresponding to the $1^{st}$ retransmission), and may also transmit new signal $s_C^0$ (which is one member of another packet) as an original transmission. STBC or SFBC may be used for the $1^{st}$ retransmission. In these examples $y^1$ is the received signal for the $1^{st}$ retransmission. If STBC is used, then two retransmit symbols are sent over two antennae and in two consecutive time periods, whereas if SFBC is sent, then two retransmit symbols are sent over two antennae and in two consecutive frequency subcarriers. For example, if using STBC, the equation for the first symbol is:

$$y\_sym0^1 = Hs^1 + n \qquad (3),$$

which is expanded in matrix form to $$y\_sym0^1 = \begin{bmatrix} h_{00} & h_{01} \\ h_{10} & h_{11} \end{bmatrix} \begin{bmatrix} s_A^1 \\ s_C^0 \end{bmatrix} + n. \qquad (4)$$

The equation for the second symbol is $$y\_sym1^1 = Hs^1 + n \qquad (5),$$

which is expanded in matrix form to $$y\_sym1^1 = \begin{bmatrix} h_{00} & h_{01} \\ h_{10} & h_{11} \end{bmatrix} \begin{bmatrix} -s_C^{0*} \\ s_A^{1*} \end{bmatrix} + n. \qquad (6)$$

In this STBC example, the * denotes a conjugate value, and the arrangement of $s_A^1$ and $s_C^0$ with their respective conjugates in the two symbols are in accordance with STBC.

MIMO receiver 106 may use several schemes when receiving and detecting an initial $0^{th}$ transmission and a $1^{st}$ retransmission. For example, successive interference cancellation (SIC) may be used, in accordance with which the noise and interference vector n for a signal transmitted on antenna 108 is subtracted from a signal transmitted on antenna 110. As another example, maximum ratio combining (MRC) may be used, in accordance with which MIMO receiver 106 multiplies a received vector with a hermitian (transposed conjugate) of the channel matrix. This multiplying may have the effect of boosting signal components and attenuating noise components. As a further example, soft combining may be used, in accordance with which simple addition is performed to combine soft information contained in the $0^{th}$ transmission and $1^{st}$ retransmission signals.

Disclosed embodiments are not limited to 2×2 MIMO schemes, but may include any number of antennae (e.g., 4×4, 16×16, etc).

Figure 2:
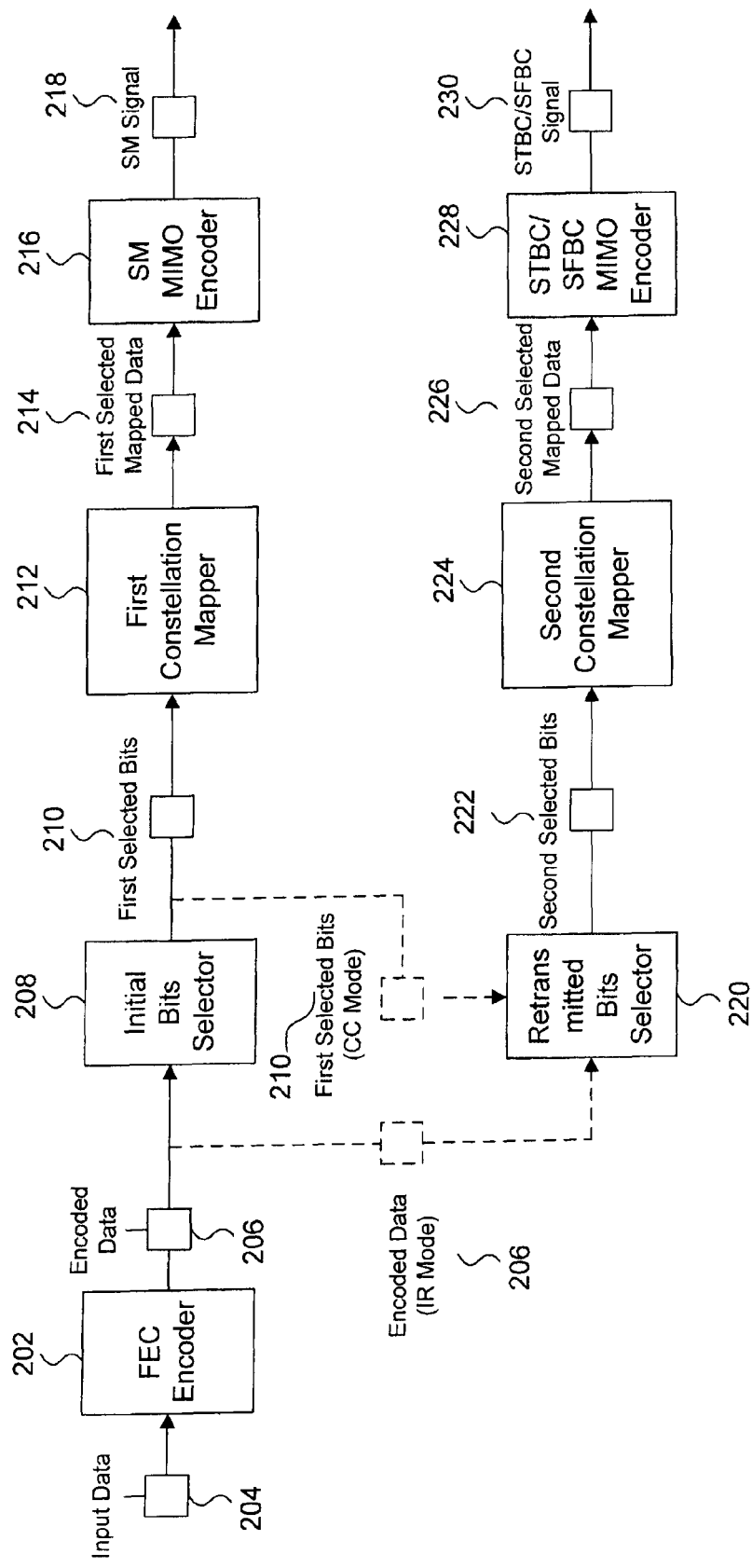
FIG. 2 is a block diagram illustrating an exemplary MIMO transmitter.

FIG. 2 is a block diagram illustrating a MIMO transmitter 200, which may correspond to MIMO transmitter 104 from FIG. 1. MIMO transmitter 200 may be used when transmitting at the symbol level. Alternatively, MIMO transmitter 200 may be used when transmitting at the bit level. MIMO transmitter 200 may include a forward error correction (FEC) encoder 202 that receives input data 204 and outputs encoded data 206. FEC encoder 202 may encode systematic (i.e. information) bits and/or bytes (or any other collection of data) within input data 204 with parity bits. The resulting parity bits may be a characteristic of the FEC encoder, regardless of whether all the parity bits are ultimately used. The parity bits may be used for error correction of the systematic bits at the receiving end after transmission.

Encoded data 206 may be encoded for error correction at the receiving end. Encoded data 206 may be encoded for an initial $0^{th}$ transmission or for a HARQ process.

If transmitter 200 is transmitting an initial $0^{th}$ transmission, an initial bits selector 208 may receive encoded data 206. Initial bits selector 208 may select portions of encoded data 206 for transmission. For example, encoded data 206 may include a systematic bit and two parity bits. In this case, initial bits selector 208 may select only the systematic bit and one of the parity bits for transmission. These selected bits may include first selected bits 210 outputted by initial bits selector 208. Thus, first selected bits 210 may include fewer parity bits than encoded data 206. This may increase overall sending capacity by reducing the total number of bits transmitted.

Initial bits selector 208 may send first selected bits 210 to a first constellation mapper 212.

First constellation mapper 212 may output first selected mapped data 214.

First constellation mapper 212 may send first selected mapped data 214 to a spatial multiplexing (SM) MIMO encoder 216. SM MIMO encoder 216 may encode first selected mapped data 214 according to spatial multiplexing (SM) and output an SM signal 218 for transmission to a receiver.

Instead of transmitting an initial $0^{th}$ transmission, transmitter 200 may, in accordance with a HARQ process, retransmit an originally transmitted signal that was not properly received. Transmitter 200 may retransmit the originally transmitted signal in accordance with HARQ, such as by chase combining (CC) mode or incremental redundancy (IR) mode.

When transmitter 200 operates in CC mode when retransmitting according to HARQ, initial bits selector 208 may send first selected bits 210 to a retransmitted bits selector 220. Retransmitted bits selector 220 may select portions or all of the first selected bits 210 for retransmission. Retransmitted bit selector 220 may output these selected bits as second selected bits 222 to a second constellation mapper 224. Second constellation mapper 224 may be the same as or different from first constellation mapper 212.

Second constellation mapper 224 may be applicable when either symbol level combining or bit level combining is ultimately used at the receiving end. For symbol level combining in the receiver, second constellation mapper 224 may map the bits and/or bytes within second selected bits 222 for aligned constellation mappings. In other words, second constellation mapper 224 may align a mapped constellation of the second selected bits 222 like a mapped constellation of first selected bits 210 performed by first constellation mapper 212. Alternatively, for bit level combining in the receiver, second constellation mapper 224 may map constellation points that are not aligned.

Second constellation mapper 224 may output second selected mapped data 226 to a space time blocking code (STBC)/space frequency blocking code (SFBC) MIMO encoder 228. STBC/SFBC MIMO encoder 228 may encode second selected mapped data 226 according to either STBC or SFBC. STBC/SFBC MIMO encoder 228 may output an STBC/SFBC signal 230 for transmission (as a retransmitted signal) to a receiver.

When transmitter 200 operates in IR mode when retransmitting according to HARQ, FEC encoder 202 may send encoded data 206 to retransmitted bits selector 220. Thus, retransmitted bits selector 220 may, instead of receiving first selected bits 210 (as was the case in CC mode), receive encoded data 206 in IR mode. Retransmitted bits selector 220 may select portions/multiples of encoded data 206 for retransmission. Retransmitted bit selector 220 may output these selected bits as second selected bits 222. Retransmitted bits selector 220 may send second selected bits 222 to a second constellation mapper 224. Second constellation mapper 224 may output second selected mapped data 226, and send second selected mapped data 226 to a STBC/SFBC MIMO encoder 228. STBC/SFBC MIMO encoder 228 may encode second selected mapped data 226 according to either STBC or SFBC. STBC/SFBC MIMO encoder 228 may output STBC/SFBC signal 230 for transmission (as a retransmitted signal) to a receiver.

Figure 3:
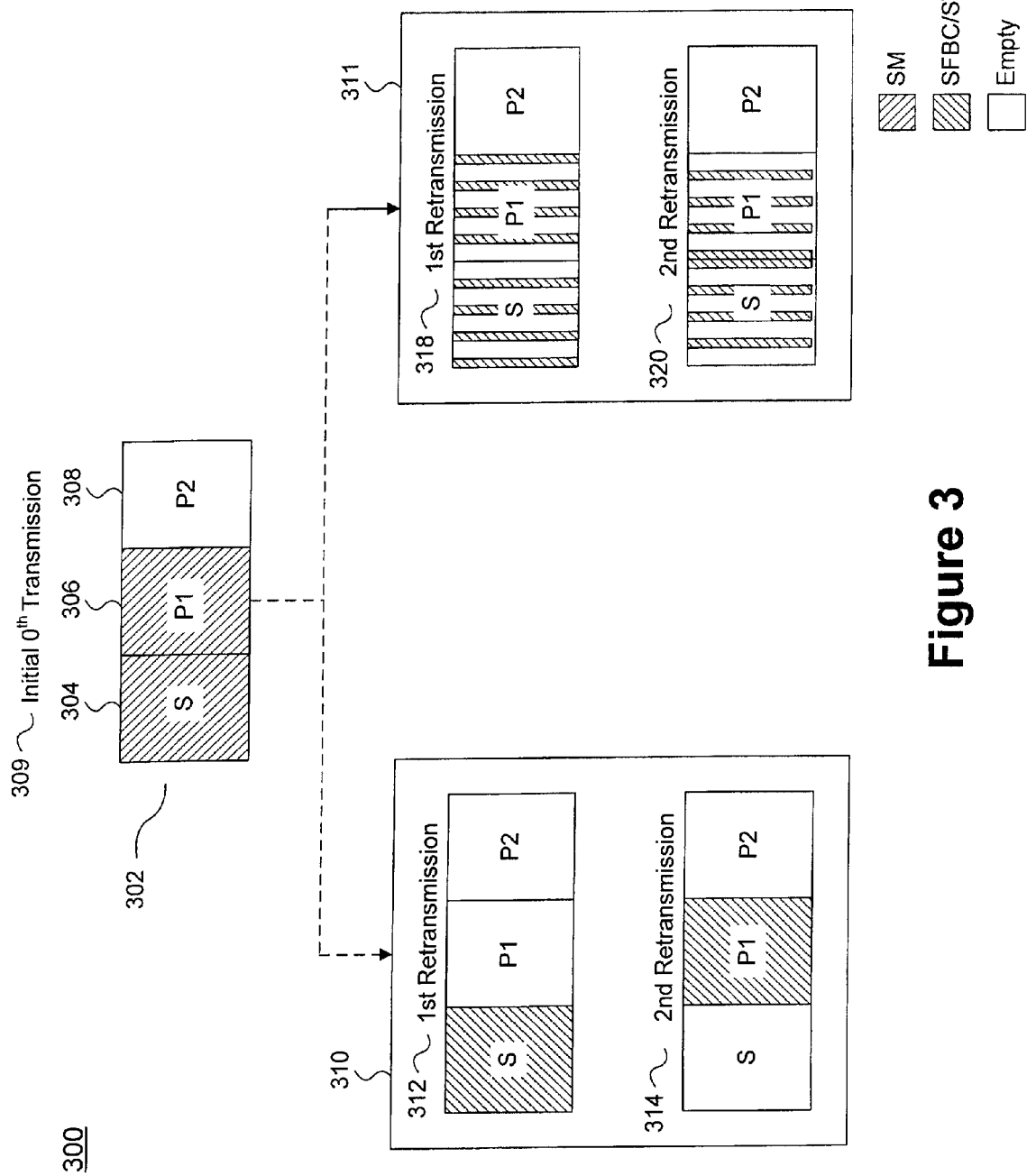
FIG. 3 is a block diagram illustrating an example of bit selection in a chase combining mode.

FIG. 3 is a block diagram 300 illustrating an example of bit selection in CC mode, which may be performed by retransmitted bits selector 220. Retransmitted bits selector 220 may perform selection of a bit, or any other grouping of data.

Block diagram 300 may include base encoded bits 302. Base encoded bits 302 may be generated by FEC encoder 202, and included in encoded data 206. Base encoded bits 302 may be the results of FEC encoder 202 with a 1/3 code rate, such that each group of systematic (i.e., information) bits (S) is associated with two groups of parity bits (P1 and P2). However, any other code rate may be used alternatively. Base encoded bits 302 may include systematic encoded bits 304 and parity encoded bits 306 and 308. Systematic encoded bits 304 may correspond to the systematic bits, while parity encoded bits 306 and 308 may correspond to the parity bits.

For an initial $0^{th}$ transmission 309 in CC mode, systematic encoded bits 304 and the parity encoded bits 306 may be selected from base encoded bits 302, for example, by initial bits selector 208. In other words, only systematic encoded bits 304 and parity encoded bits 306 from base encoded bits 302 are sent on initial $0^{th}$ transmission 309, as is indicated by shading of their respective blocks. The selection of two out of the three bit segments (called puncturing) in base encoded bits 302 may both decrease the amount of data that needs to be sent from base encoded bits 302, and that the amount of data that is included in the $0^{th}$ transmission. This may save more spectral efficiency compared with non-punctured transmission, thereby enhancing overall system throughput. Systematic encoded bits 304 and parity encoded bits 306 may be transmitted in the initial $0^{th}$ transmission using SM (as indicated by their shading). Moreover, systematic encoded bits 304 and parity encoded bits 306 may include, and/or may be included in, first selected bits 210.

In CC mode, bits for retransmission may be selected from systematic encoded bits 304 and parity encoded bits 306 that were sent with initial $0^{th}$ transmission 309. Examples 310 and 311 are different ways of using systematic encoded bits 304 and parity encoded bits 306 for retransmission in CC mode.

Example 310 includes both a $1^{st}$ retransmission 312 and a $2^{nd}$ retransmission 314. 1st retransmission 312 may include systematic bits S, which correspond to systematic encoded bits 304 that were sent in initial $0^{th}$ transmission 309. Moreover, $2^{nd}$ retransmission 314 may include parity bits P1 which correspond to parity encoded bits 306 that were sent in initial $0^{th}$ transmission 309. Bits S and P1 in example 310 may be transmitted in $1^{st}$ retransmission 312 and $2^{nd}$ retransmission 314, respectively, using SFBC/STBC (as indicated by their shading).

Example 311 includes both a $1^{st}$ retransmission 318 and a $2^{nd}$ retransmission 320. In example 311, bits for the retransmissions may also be selected from systematic encoded bits 304 and parity encoded bits 306 that were sent with initial $0^{th}$ transmission 309. However, example 311 may select individual bits from within S and P1, without selecting the entire group of bits, for both 1st retransmission 318 and second retransmission 320. The individual bits selected in example 311 may be sufficient for error correction at the receiving end. For example, the portion of individual bits from systematic bits S of first retransmission 318, may be sufficient to represent bits S. Moreover, this allows bits from both S and P1 to be selected in both $1^{st}$ retransmission 318 and $2^{nd}$ retransmission 320. This may enhance error correction at the receiving end because both the $1^{st}$ retransmission and the $2^{nd}$ retransmission include parity bits from P1. Moreover, the bits selected in $1^{st}$ retransmission 318 may differ from the bits selected in the $2^{nd}$ retransmission 320. Alternatively, the bits selected in $1^{st}$ retransmission 318 may overlap with the bits selected in the $2^{nd}$ retransmission 320.

Figure 4:
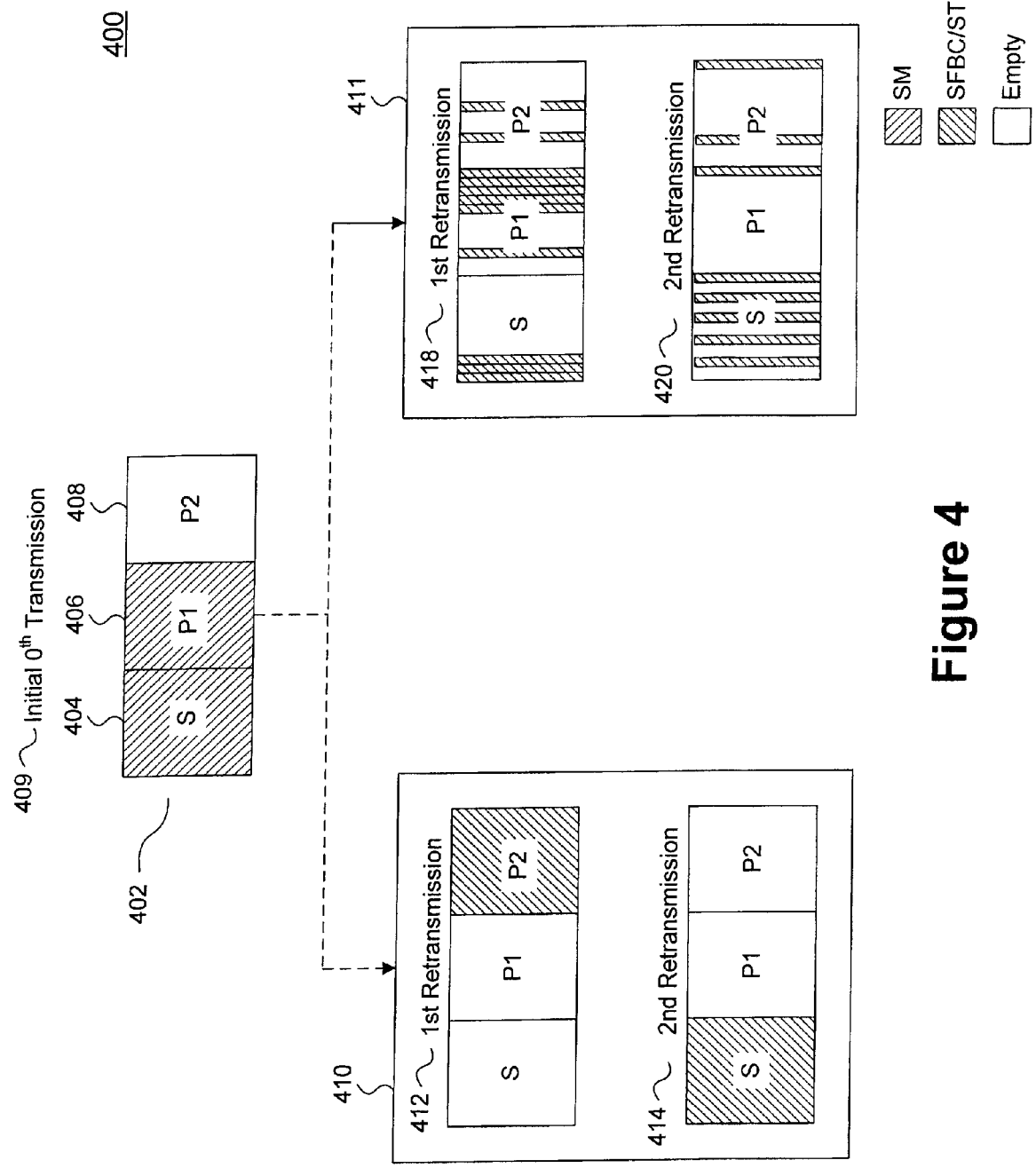
FIG. 4 is a block diagram illustrating an example of bit selection in an incremental redundancy mode.

FIG. 4 is a block diagram 400 illustrating an example of bit selection in IR mode, which may be performed by retransmitted bits selector 220. Bit selection in IR mode may be an alternative to bit selection in CC mode, which was described above in FIG. 3. Retransmitted bits selector 220 may perform selection of all bits of systematic bits and/or parity bits, or any other grouping of these bits. Block diagram 400 may include base encoded bits 402. Base encoded bits 402 may be generated by FEC encoder 202, and included in encoded data 206. Base encoded bits 402 may be the result of FEC encoder 202 with a 1/3 code rate, such that each group of systematic (i.e. information) bits (S) is associated with two groups of parity bits (P1 and P2). However, any other code rate may be used alternatively. Base encoded bits 402 may include systematic encoded bits 404 and parity encoded bits 406 and 408. Systematic encoded bits 404 may correspond to the systematic bits, while parity encoded bits 406 and 408 correspond to the parity bits.

For an initial $0^{th}$ transmission 409 in IR mode, systematic encoded bits 404 and parity encoded bits 406 may be selected from base encoded bits 402, for example, by initial bits selector 208. In other words, only systematic encoded bits 404 and parity encoded bits 406 from base encoded bits 402 are sent on initial $0^{th}$ transmission 409, as is indicated by shading of their respective blocks. The selection of two out of the three portions of bits in base encoded bits 402 may improve throughout by decreasing the number of parity bits sent. Systematic encoded bits 404 and parity encoded bits 406 may be transmitted in the initial $0^{th}$ transmission using SM (as indicated by their shading). Moreover, systematic encoded bits 404 and parity encoded bits 406 may include, and/or may be included in, first selected bits 210.

In IR mode, bits for retransmission may be selected from any of bits 404, 406, and 408. This is in contrast to CC mode, in which the bits for retransmission may be selected only from bits that were included in the initial $0^{th}$ transmission (which in the example of FIG. 4 would be systematic encoded bits 404 and parity encoded bits 406). Moreover, examples 410 and 411 are different ways of using bits 404, 406, and 408 in IR mode.

Example 410 includes both a $1^{st}$ retransmission 412 and a $2^{nd}$ retransmission 414. 1st retransmission 412 may include systematic bits S, which corresponds to bits 404 that was sent in initial $0^{th}$ transmission 409. Moreover, $2^{nd}$ retransmission 414 may include parity bits P2 that were not sent in the initial $0^{th}$ transmission. Bits S and P2 in example 410 may be transmitted in the $1^{st}$ retransmission 412 and $2^{nd}$ retransmission 414, respectively, using SFBC/STBC (as indicated by their shading).

Example 411 includes both a $1^{st}$ retransmission 418 and a $2^{nd}$ retransmission 420. In example 411, bits for retransmission may also be selected from any of bits 404, 406, and 408 from base encoded bits 402. However, example 411 may select individual bits from within S, P1, and P2 without selecting the entire group of bits, for both a $1^{st}$ retransmission 418 and a $2^{nd}$ retransmission 420. The individual bits selected in example 411 may be sufficient for error correction at the receiving end. For example, the individual bits from bits S of $1^{st}$ retransmission 418, may be sufficient to represent bits S. Moreover, this allows bits from S, P1, and P2 to be selected in both $1^{st}$ retransmission 418 and $2^{nd}$ retransmission 420. This may enhance error correction at the receiving end because both the $1^{st}$ retransmission and the $2^{nd}$ retransmission may include parity bits from P1 and P2. Moreover, the bits selected in $1^{st}$ retransmission 418 may differ from the bits selected in the $2^{nd}$ retransmission 420. Alternatively, the bits selected in $1^{st}$ retransmission 418 may overlap with the bits selected in the $2^{nd}$ retransmission 420.

As discussed, both FIGS. 3 and 4 include a $1^{st}$ retransmission and a $2^{nd}$ retransmission. In disclosed embodiments, a constellation order of the $1^{st}$ and $2^{nd}$ retransmission may be different from a constellation order of the $0^{th}$ transmission. This may be due to a modulation step-up, in which multiple encoded bits from the $0^{th}$ retransmission are included in the retransmissions.

Moreover, in example 311 of CC mode and/or example 411 of IR mode, as discussed in FIGS. 3 and 4, respectively, retransmitted bits selector 220 may use different schemes to select the individual bits for retransmission. For example, bit priority mapping and/or constellation rearrangement may be used for selecting the individual bits for retransmission. Moreover, the number of bits selected for retransmission may be a fraction of the number of bits in the initial $0^{th}$ transmission. The fraction may be a predetermined retransmit fraction (1/3 in the examples in FIGS. 3 and 4), that may be predetermined by the transmitter and/or receiver. Alternatively, the total number of retransmitted bits may also be larger than the number of bits in the initial $0^{th}$ transmission, and this can be accomplished by applying a higher order of constellation than the initial $0^{th}$ transmission. For example, the total number of retransmitted bits may be a multiple of the number of bits in the initial $0^{th}$ transmission. The multiple may be determined by a predetermined retransmit factor, that may be predetermined by the transmitter and/or receiver. The multiple can itself be a whole number or a mixed fraction. For example, instead of the predetermined retransmit fraction being 1/3 in FIGS. 3 and 4, it may be 5/3.

Figure 5:
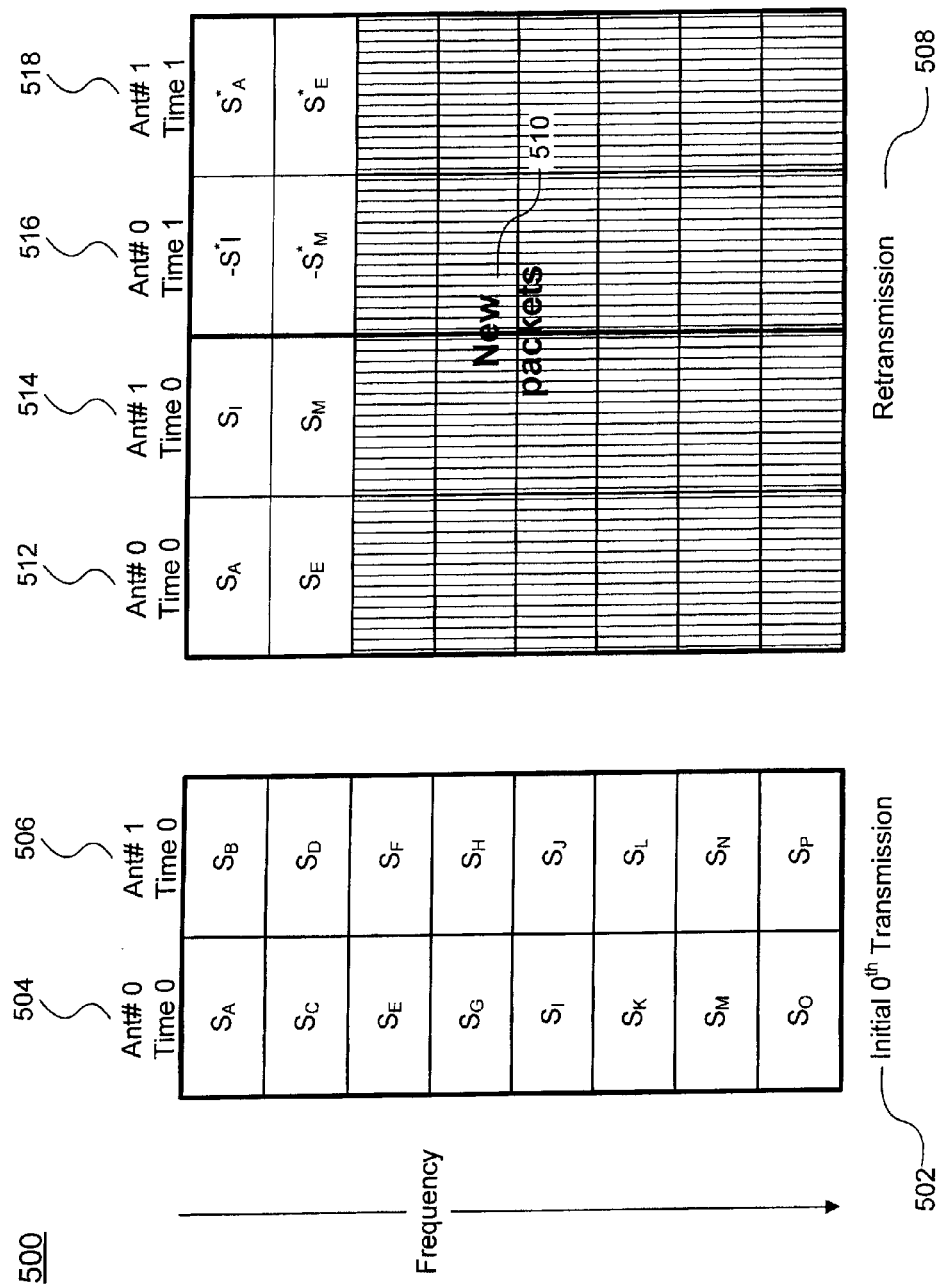
FIG. 5 is a packet diagram of a $0^{th}$ transmission and $1^{st}$ retransmission.

FIG. 5 is a packet diagram 500 that illustrates an initial $0^{th}$ transmission 502. Initial $0^{th}$ transmission 502 may be a packet that includes data 504 sent on an antenna 0 at time 0, and data 506 sent on an antenna 1 at time 0. For example, antenna 0 and antenna 1 may correspond to antennae 108 and 110 of MIMO transmitter 104. Each symbol ($s_A$ through $s_P$) of data 504 and data 506 may be sent at time 0, but on different antennae and/or frequencies. In this example, a CRC check is run on initial $0^{th}$ transmission 502. The CRC check may reveal an error in initial $0^{th}$ transmission 502. Based on the predetermined retransmit fraction, a portion of the symbols $s_A$ through $s_P$ from data 504 and data 506 may be selected to be retransmitted in an attempt to correct the error in initial $0^{th}$ transmission 502. The predetermined retransmit fraction may be any number 1/N, for N=1, 2, 3, 4, . . . As discussed previously, the predetermined retransmit fraction may be a whole number or a mixed fraction. In this example, the predetermined retransmit fraction is 1/4 and, therefore, four symbols out of the original 16 symbols of initial $0^{th}$ transmission 502 are selected for retransmission ($s_A$, $s_E$, $s_I$, and $s_M$). In this example, the selected bits are aligned mapped in constellation mapper 205, but the mapping is not needed if bit level combining is applied in the receiver. These symbols are assembled in a retransmission 508, along with new packets 510. By including only a portion of initial $0^{th}$ transmission 502 in retransmission 508, throughput can be improved by including new packets 510 in retransmission 508.

Retransmission 508 may include data 512 sent on antenna 0 at time 0, and data 514 sent on antenna 1 at time 0. Retransmission 508 may also include data 516 sent on antenna 0 at time 1, and data 518 sent on antenna 1 at time 1. The arrangement of symbols $s_A$, $s_E$, $s_I$, and $s_M$ in data 512, 514, 516, and 518 may be orthogonal, and consistent with retransmission using the exemplary technique STBC. Soft information of the retransmitted symbols $s_{A(STBC)}$, $s_{E(STBC)}$, $s_{I(STBC)}$, and $s_{M(STBC)}$ may then be obtained at the receiver (with the STBC in the subscript denoting the use of STBC in the $1^{st}$ retransmission).

Figure 6:
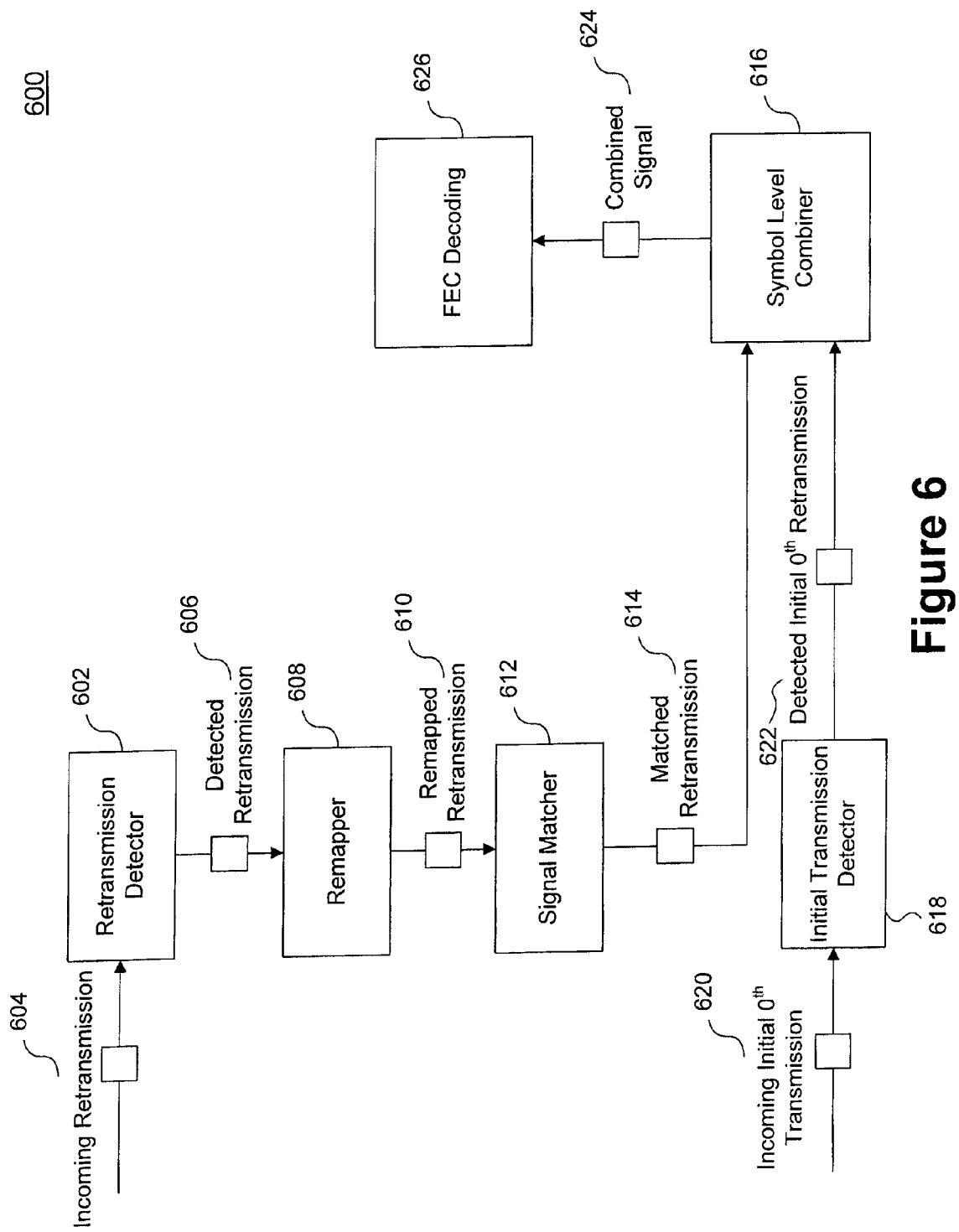
FIG. 6 is a block diagram illustrating a generalized example of a MIMO receiver receiving signals at the symbol level.

FIG. 6 is a block diagram illustrating a generalized example of a MIMO receiver 600, which may correspond to MIMO receiver 106. MIMO receiver 600 may be used when receiving signals at the symbol level.

MIMO receiver 600 may include a retransmission detector 602. Retransmission detector 602 may receive and detect an incoming retransmission 604. Retransmission detector 602 may send a detected retransmission 606 to a remapper 608. Remapper 608 may remap the detected retransmission 606 to improve signal quality. Remapper 608 may perform constellation and/or bit remapping on detected retransmission 606. Remapper 608 may send a remapped retransmission 610 to a signal matcher 612. Signal matcher 612 may determine if there is overlap between remapped retransmission 610 and any previously received signal. This overlap can be determined by examining remapped transmission 610. Signal matcher 612 may send a matched retransmission 614 to a symbol level combiner 616.

MIMO receiver 600 may also include an initial transmission detector 618. Initial transmission detector 618 may receive and detect an incoming initial $0^{th}$ transmission 620. Initial transmission detector 618 may send a detected initial $0^{th}$ transmission 622 to symbol level combiner 616. Symbol level combiner 616 may use matched retransmission 614 to correct errors in detected initial $0^{th}$ transmission 622. The correction may be implemented to the extent that matched retransmission 614 and detected initial $0^{th}$ transmission 622 overlap. Symbol level combiner 616 may combine portions of matched retransmission 614 with detected initial $0^{th}$ transmission 622. Symbol level combiner 616 may send a combined signal 624 to a FEC decoder 626 for FEC decoding.

Figure 7:
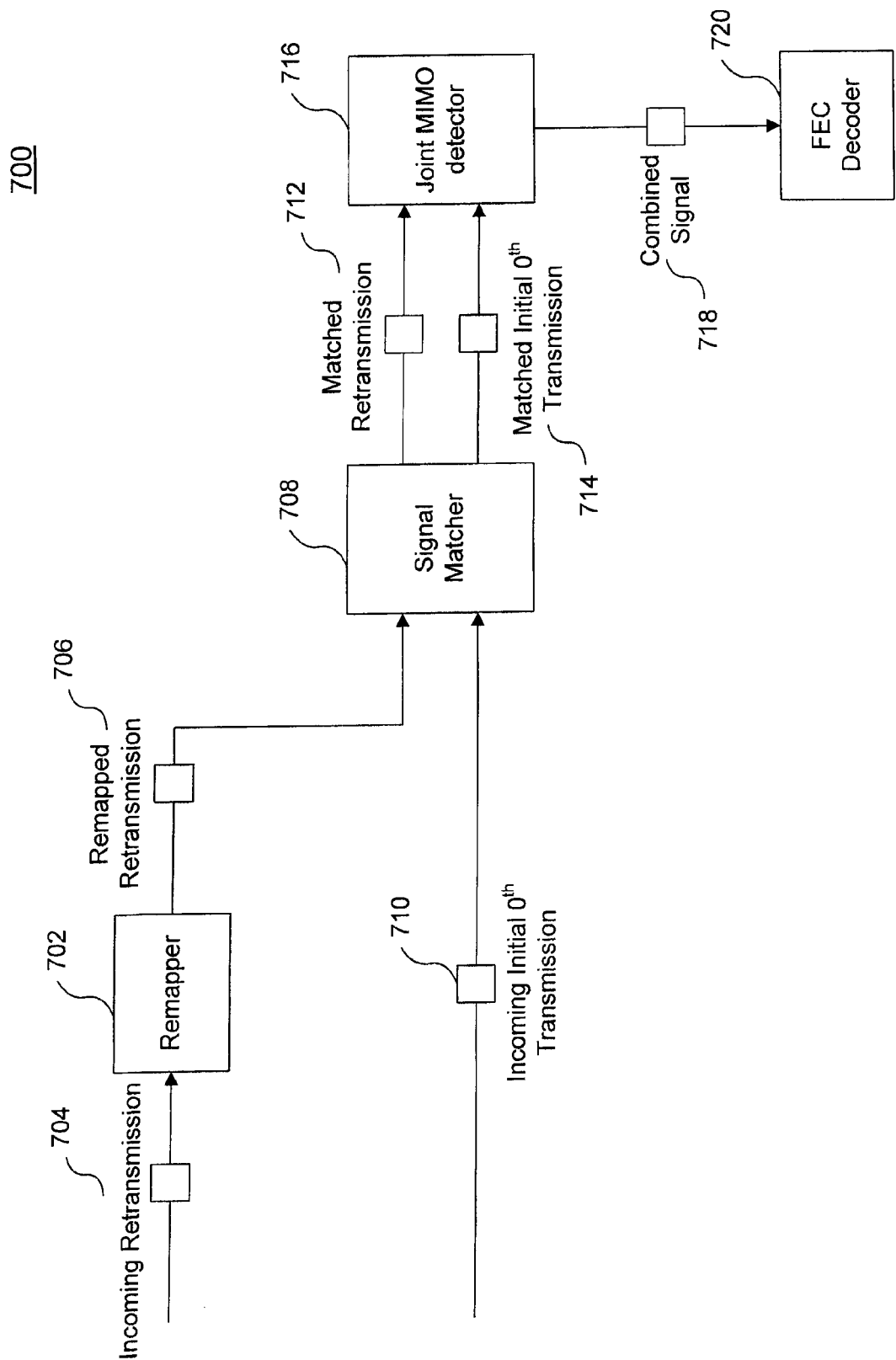
FIG. 7 is a block diagram illustrating a generalized example of a MIMO receiver receiving signals at the symbol level using joint detection.

FIG. 7 is a block diagram illustrating another generalized example of a MIMO receiver 700, which may correspond to MIMO receiver 106. MIMO receiver 700 may also be used when receiving signals at the symbol level. MIMO receiver 700 may use joint detection, unlike MIMO receiver 600.

MIMO receiver 700 may include a remapper 702. Remapper 702 may receive an incoming retransmission 704. Remapper 702 may remap incoming retransmission 704 to improve signal quality. Remapper 702 may send a remapped retransmission 706 to a signal matcher 708. Signal matcher 708 may also receive an incoming initial $0^{th}$ transmission 710. Signal matcher 708 may determine if there is overlap between remapped retransmission 706 and incoming initial $0^{th}$ transmission 710. Signal matcher 708 may output a matched retransmission 712 and a matched initial $0^{th}$ transmission 714 to a joint MIMO detector 716. Joint MIMO detector 716 may operate according to ML. Joint MIMO detector 716 may include a ML Decoder and/or Minimum Mean Square Error (MMSE) detector. Joint MIMO detector 716 may reduce error in matched retransmission 712 and/or matched initial $0^{th}$ transmission 714. Joint MIMO detector 716 may send a combined signal 718 to a FEC decoder 720 for FEC decoding.

Figure 8:
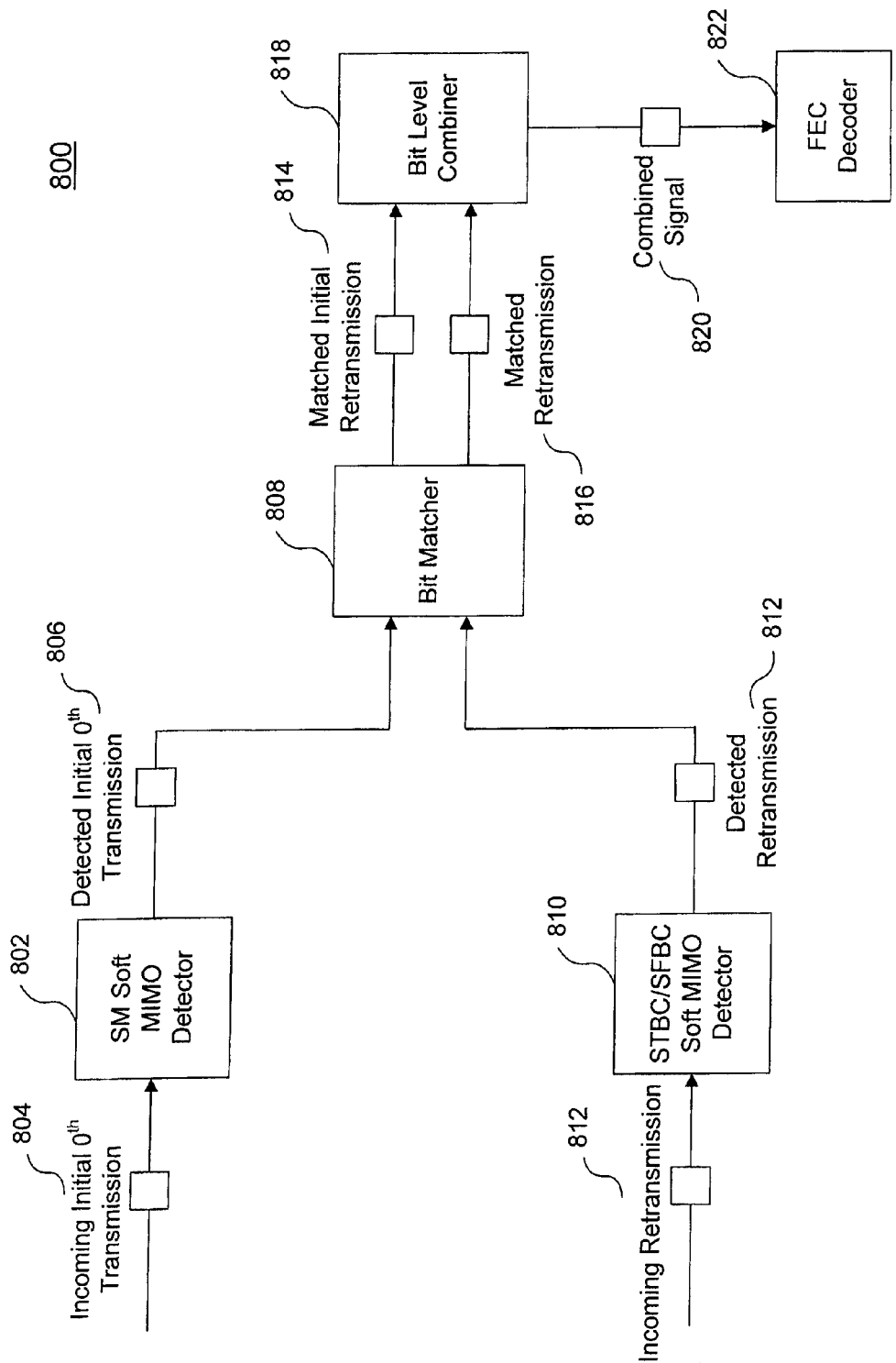
FIG. 8 is a block diagram illustrating a generalized example of a MIMO receiver receiving signals at the bit level.

FIG. 8 is a block diagram illustrating yet another generalized example of a MIMO receiver 800, which may correspond to MIMO receiver 106. MIMO receiver 800 may be used when receiving signals at the bit level, instead of the symbol level. MIMO receiver 800 may include an SM soft MIMO detector 802, which may receive an incoming initial $0^{th}$ transmission 804. Incoming initial $0^{th}$ transmission 804 may be formatted according to SM. SM soft MIMO detector 802 may send a detected initial $0^{th}$ transmission 806 to a bit matcher 808.

MIMO receiver 800 may also include an STBC/SFBC soft MIMO detector 810, which may receive an incoming retransmission 812. Incoming retransmission 812 may be formatted according to STBC and/or SFBC. STBC/SFBC soft MIMO detector 810 may send detected retransmission 812 to bit matcher 808. Bit matcher 808 may determine if there is overlap between detected initial $0^{th}$ transmission 806 and detected retransmission 812. Bit matcher 808 may output a matched initial $0^{th}$ transmission 814 and a matched retransmission 816 and send these outputs to a bit level combiner 818.

Bit level combiner 818 may use the matched retransmission 816 to correct errors in matched initial $0^{th}$ transmission 814. The correction may be implemented to the extent that the matched retransmission 816 and the matched initial $0^{th}$ transmission 814 overlap. Bit level combiner 818 may soft combine portions of matched initial $0^{th}$ transmission 814 with matched retransmission 816. Bit level combiner 816 may send a combined signal 820 to a FEC decoder 822 for FEC decoding.

Figure 9:
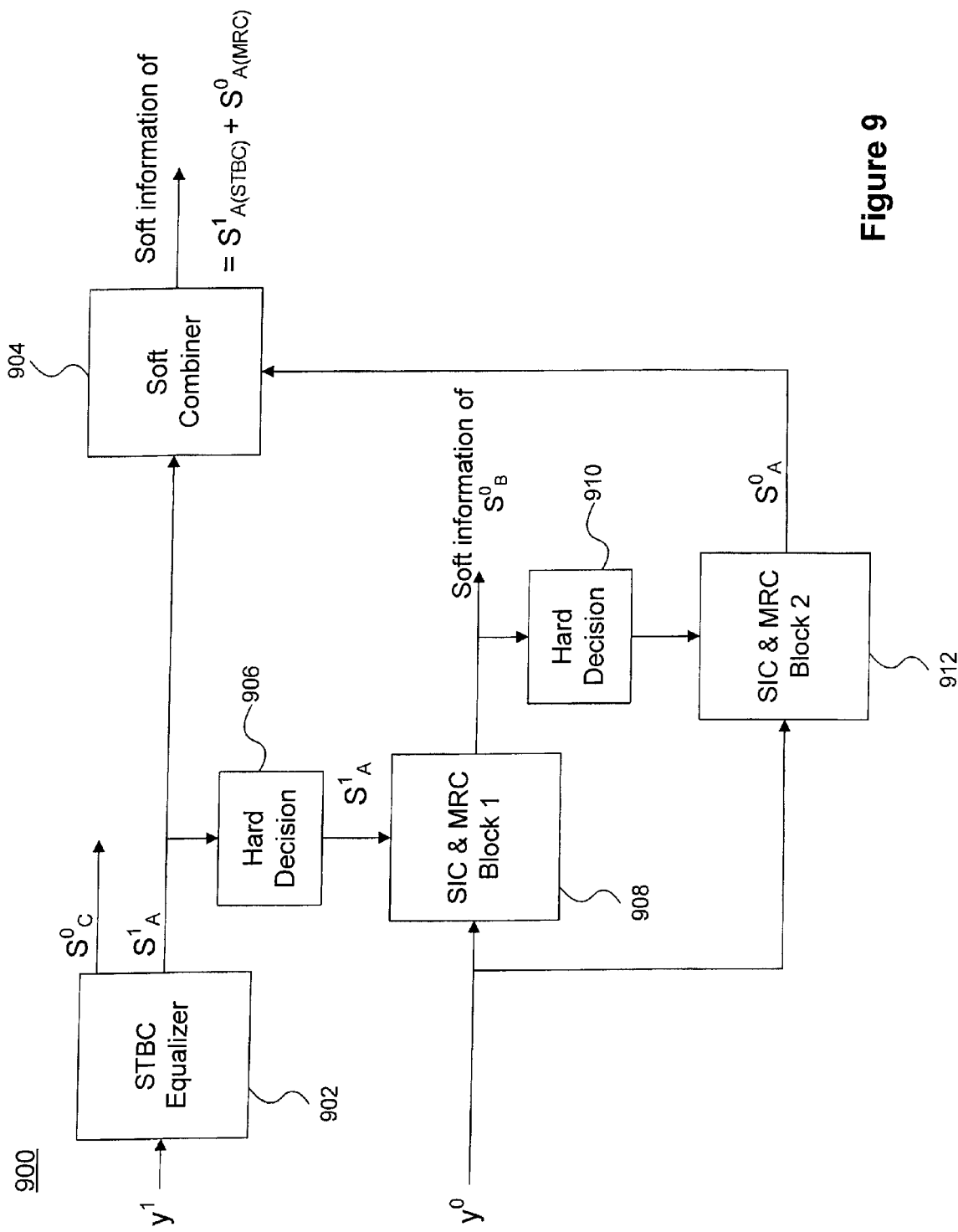
FIG. 9 is a block diagram illustrating a detailed example of a MIMO receiver at the symbol level.

FIG. 9 is a block diagram illustrating a detailed example of a MIMO receiver 900, which may correspond to MIMO receiver 106. FIG. 9 illustrates processing of signals $y^0$ and $y^1$ to retrieve signals $s_A^0$ and $s_B^0$ in an error free condition. FIG. 9 also illustrates processing of STBC HARQ retransmit signal $s_A^1$, which can be used to correct error bearing signals $s_A^0$ and $s_B^0$. MIMO receiver 900 may also include an FEC decoder (not shown) to correct errors in $s_A^0$ and $s_B^0$.

An STBC equalizer 902 may receive retransmission signal $y^1$ (as defined in equations 3-6) and may output signals $s_A^1$ and $s_C^0$. STBC equalizer 902 may include an MRC decoder. Signal $s_C^0$ outputted from STBC equalizer 902 may be a new signal transmitted for the first time, and therefore, is not used for error correction of previously received signals. STBC equalizer 902 may send signal $s_A^1$ to a soft combiner 904 and may also send signal $s_A^1$ to a hard decision function 906. Hard decision function 906 may quantize the equalized symbols within $s_A^1$ to their nearest constellation points. Signal $s_A^1$ may be output from hard decision function 906 and sent to an SIC and MRC Block 1 (908), which may also receive initial $0^{th}$ transmission signal $y^0$ (as defined in equations 1-2). SIC and MRC Block 1 (908) may process the signals $y^0$ and $y^1$, and then may output $s_B^0$ (a component of signal $y^0$). The purpose of SIC and MRC Block 1 (908) may be to output an accurate $s_B^0$ that is corrected and error free. SIC and MRC Block 1 (908) may extract an accurate $s_B^0$ of $y^0$ by cancelling the $s_A^0$ symbol of $y^0$ using the $s_A^1$ symbol of $y^1$ received from hard decision function 906. The higher diversity (e.g. 4) of $s_A^1$ may enable SIC and MRC Block 1 (908) to cancel the $s_A^0$ portions of $y^0$. SIC and MRC Block 1 (908) may operate according to the following equation.

$$y^0 - h_0^0 s_A^1 = h_1^0 s_B^0 + n \qquad (7)$$

SIC and MRC Block 1 (908) may make symbol $s_B^0$ available as a corrected symbol. Moreover, SIC and MRC Block 1 (908) may send signal $s_B^0$ to a hard decision function 910. Hard decision function 910 may quantize the equalized symbols within $s_B^0$ to their nearest constellation points. Hard decision function 910 may then send $s_B^0$ to an SIC and MRC Block 2 (912), which may also receive signal $y^0$. SIC and MRC Block 2 (912) may be similar to SIC and MRC Block 1 (908). The purpose of SIC and MRC Block 2 (912) may be to output an accurate $s_A^0$ that is corrected and error free. SIC and MRC Block 2 (912) may extract an accurate $s_A^0$ of $y^0$ by cancelling the $s_B^0$ symbol from $y^0$ using $s_B^0$ symbol of $y^0$ received from hard decision function 910. SIC and MRC Block 2 (912) may send signal $s_A^0$ to soft combiner 904. Soft combiner 904 may combine $s_A^0$ with $s_A^1$. The output from soft combiner 904 may include a combination of original error bearing signal $s_A^0$, which has been processed according to MRC, and retransmit signal $s_A^1$, which has been processed according to STBC. The combined soft information $s_{A(STBC)}^1 + s_{A(MRC)}^0$ may have a higher tolerance for noise effect. The signal to noise ratio of the combined soft information $s_{A(STBC)}^1 + s_{A(MRC)}^0$ may increase as results are combined. The combined soft information $s_{A(STBC)}^1 + s_{A(MRC)}^0$ may provide a more reliable and corrected signal $s_A$.

Figure 10:
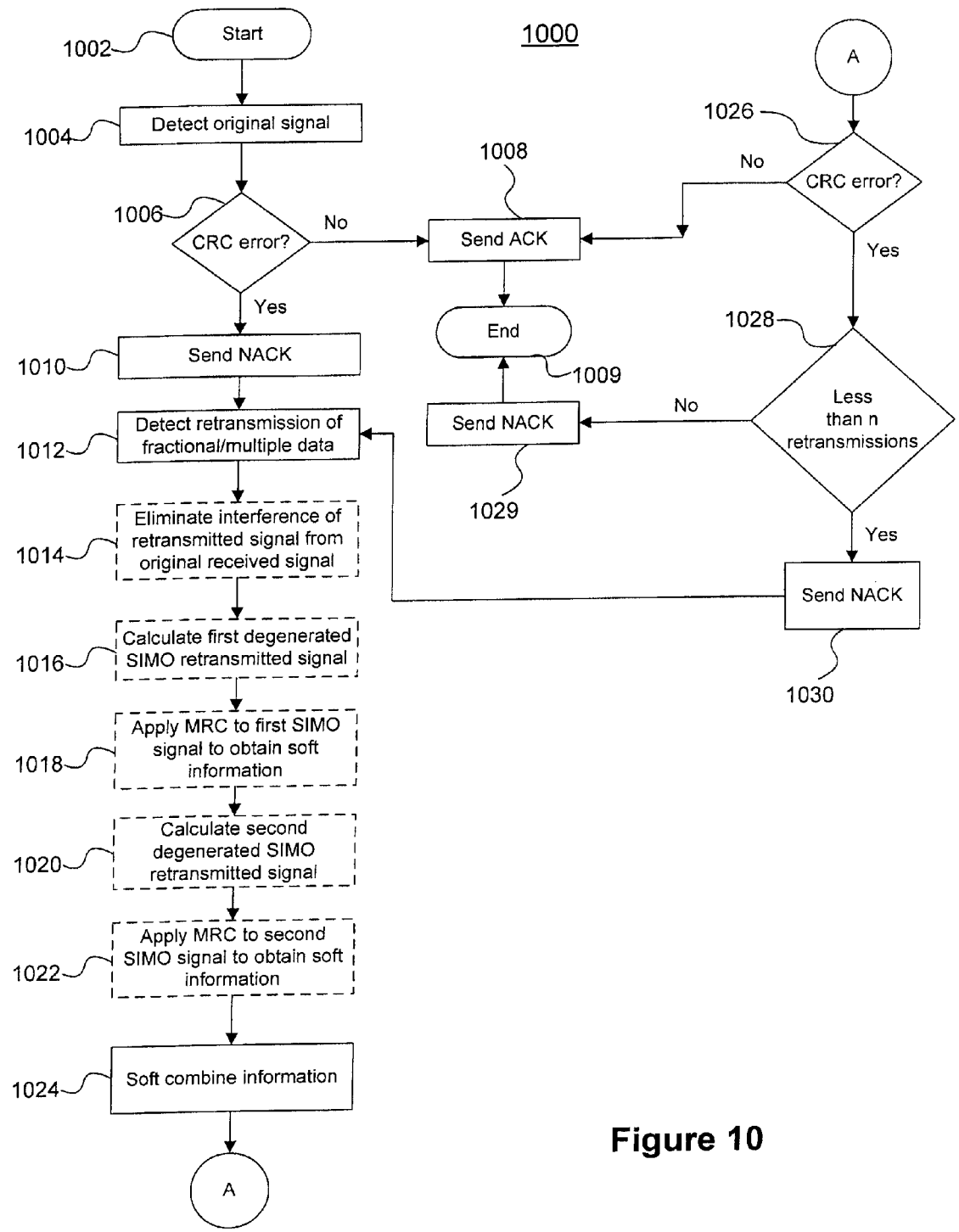
FIG. 10 is an error correction flow diagram.

FIG. 10 is a flow diagram illustrating a process 1000 performed by a receiver, e.g., MIMO receiver 106 or 900, for using, as an example, the $1^{st}$ retransmission to determine the correct soft information contained in a previously received error bearing signal $y^0$. The process 1000 starts at 1002. At 1004, the receiver receives an original signal from a transmitter, e.g., MIMO transmitter 104. The original signal may be mathematically represented as:

(8)

In the representation of equation 8, the horizontal line represents the spatial domain, while the vertical line represents the frequency domain. In this way, signal $[s_A\ s_B]$ is transmitted by two antennas (in the spatial domain) at a first frequency subcarrier, and signal $[s_C\ s_d]$ is transmitted by the two antennas at a second frequency subcarrier.

The original signal from equation 8 may be formatted according to a first format, such as SM. At 1006, the receiver may run a CRC check on the original signal. If the CRC check results in no error (1006-No), the receiver may send an ACE to the transmitter at 1008, thereby acknowledging and error free original signal. Then, at 1009, the process ends.

However, if the CRC check does determine the presence of an error in the received signal (1006-Yes), the receiver may instead send a NACK to the transmitter at 1010. At 1012, the receiver may receive a partially or multiplied retransmitted signal from the transmitter, which may include a fraction of the data from the original signal, or a multiple of the data from the original signal. Moreover, the retransmitted signal may be formatted according to a second format, different from the first format of the original signal. For example, the retransmitted signal may be formatted according to STBC and/or SFBC. In SFBC, the retransmitted signal may be represented as:

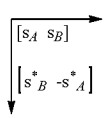

(9)

In the representation of equation 9, the horizontal line represents the spatial domain, while the vertical line represents the frequency domain. In this way, signal $[s_A\ s_B]$ is retransmitted by two antennas (in the spatial domain) at a first frequency subcarrier, while its orthogonal signal $[s^*_B\ -s^*_A]$ is transmitted by the two antennas at a second frequency subcarrier. Equation 9 is a partial retransmit of the original signal from equation 8, because only original symbols $s_A\ s_B$ are transmitted, while $s_c$ and $s_d$ are not.

Blocks 1014-1022 are optional steps that may be used for symbol level combining. Specifically, blocks 1014-1022 may be used when the initial $0^{th}$ transmission is in SM format and the $1^{st}$ retransmission and/or $2^{nd}$ retransmission is in STBC/SFBC format. Thus, blocks 1014-1022 are dashed to indicate that they are optional.

At 1014 the receiver may perform SIC processing on the original transmission and the retransmission. The SIC may be performed, for example by SIC & MRC Block 1 (908) in FIG. 9. The SIC processing may subtract, from the original signal, the interference of the retransmitted signal. Moreover, the purpose of the SIC processing may be to recover an interference free signal $s_B$, from the original transmission. At 1016 SIC & MRC Block 1 (908) may calculate the result of this SIC processing as a first degenerated SIMO signal. The first degenerated SIMO signal may be represented as $$y' = s_B. \quad (10)$$

At 1018, SIC & MRC Block 1 (908) may apply MRC to this first degenerated SIMO signal of equation 10 to obtain signal $s_{B(MRC)}$. Soft information of signal $s_{B(MRC)}$ may then be fed back and subtracted from the original signal (from equation 8) to obtain a second degenerated SIMO signal. For example, at 1020, SIC & MRC Block 2 (912) in FIG. 9 may calculate the second degenerated SIMO signal by subtracting $s_{B(MRC)}$ from the original signal. The second degenerated SIMO signal may represent the remaining part of the original signal that is also part of the retransmitted signal (i.e. $s_A$). The second degenerated SIMO signal may be determined according to the following equation:

$$y'' = s_A. \quad (11)$$

At 1022, SIC & MRC Block 2 (912) in FIG. 9 may apply MRC to this second degenerated SIMO signal of equation 11 to obtain signal $s_{A(MRC)}$. Further, in addition to, or instead of, using MRC to solve the first and second degenerated SIMO signals as outlined above, some embodiments may use a MIMO detector to detect signals and enhance performance.

At 1024, Soft Combiner 904 in FIG. 9 may soft combine the soft information $s_{A(MRC)}$ from the second degenerated SIMO signal with soft information $s_{A(STBC)}$ from the retransmitted signal. The result of the soft combining, $s_{A(MRC)} + s_{A(STBC)}$, is an attempt by the receiver to correct the original packet, which previously failed the CRC check. Alternatively, the soft combiner 904 may soft combine the soft information of $s_A^1$ and the soft information of $s_{A(STBC)}$ in bit level, in this case, Blocks 1014-1022 are optional steps, as indicated by dashed lines.

At 1026, a CRC check is run on soft combined signal of a corrected version of the original packet to determine if there is still an error in the signal. If there is no error (1026-No), then the receiver may send an ACE to the transmitter at 1008, and then end at 1009. However, if there is an error in the signal (1026-Yes), the receiver may determine if the total number of retransmissions thus far are less than a predetermined number n at 1028. If the number of retransmissions is not less than n (1028-No), the receiver sends a NACK to the transmitter at 1029, and then may end at 1009. However, if the number of retransmissions is less than n (1028-Yes), then at 1030 the receiver may send a NACK to the transmitter. The process then moves back to 1012, and the receiver receives another retransmission from the transmitter. In some embodiments, the receiver will send an ACE upon determining that there is an error in the signal (1026-Yes), without determining whether the total number of retransmissions thus far are less than the predetermined number n. In those embodiments, the transmitter may determine whether the total number of retransmissions would exceed n, and if so, would not send an additional retransmission.

The additional retransmission may include symbols from the original transmission, that were not included in prior retransmission. For example, an additional retransmission may be represented as:

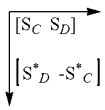

$$\begin{bmatrix} [s_C \ s_D] \\ [s^*_D \ -s^*_C] \end{bmatrix} \quad (13)$$

In the representation of equation 13, the horizontal line represents the spatial domain, while the vertical line represents the frequency domain. In this way, signal $[s_C \ s_D]$ is retransmitted by two antennas (in the spatial domain) at a first frequency subcarrier, while its orthogonal signal $[s^*_D -s^*_C]$ is transmitted by the two antennas at a second frequency subcarrier. Equation 13 is a partial retransmit of the original signal from equation 8, because only original symbols $s_C \ s_D$ are transmitted, while $s_A$ and $s_B$ are not (those were transmitted in the previous retransmission in equation 9).

Using STBC and/or SFBC for retransmission instead of SM may lead to buffer savings as well as decreased complexity. Disclosed embodiments are not limited to the use of SM, STBC, and SFBC, and may include other formats. Moreover, a transmitter may determine which MIMO mode to use for retransmission.

Figure 11:
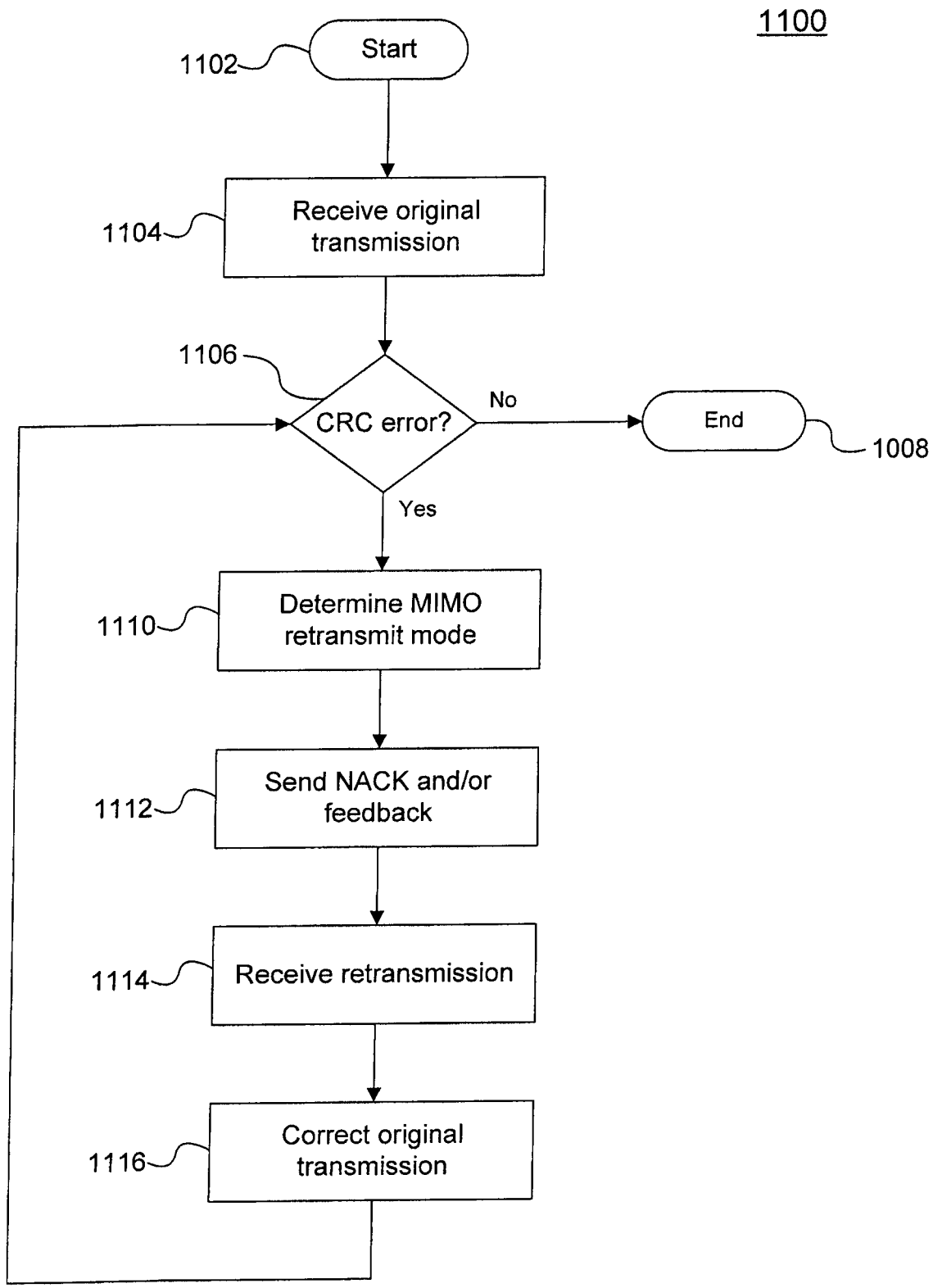
FIG. 11 is a flow diagram illustrating an adaptive MIMO mode retransmission.

FIG. 11 is a flow diagram illustrating a process 1100, which may be performed by, for example MIMO receiver 106. Process 1100 illustrates an adaptive MIMO mode retransmission in which the MIMO mode of the retransmitted signal may depend on feedback sent from the receiver to the transmitter. Alternatively, a non-adaptive MIMO mode retransmission may be used in which MIMO mode of the retransmission may be predetermined.

Process 1100 begins at 1102. At 1104, the receiver may receive an original transmission. At 1106, the receiver may determine if there is a CRC error in the original transmission. If there is no CRC error (1106-No), then the process ends at 1108. If there is a CRC error (1106-Yes), then, at 1110, the receiver may determine an appropriate MIMO mode for a retransmission. Alternatively, the receiver may not determine an appropriate MIMO mode for retransmission. At 1112, the receiver may send a NACK to the transmitter. The receiver may also send feedback to the transmitter which may indicate an appropriate MIMO mode for retransmission. The feedback may describe a channel quality. For example, the feedback may include a carrier to interface noise ratio (CINR), rank, and/or a correlation matrix. The rank corresponds to an actual data capacity of the channel. In this way, a transmission can only be presumed to be error free if an actual MIMO rate does not exceed the actual data capacity of the channel (i.e., the channel rank.)

The MIMO rate may be a transmission rate of data carried in a MIMO system. The MIMO rate may vary according to a MIMO format. Alternatively, the MIMO rate may vary independently of the format. A MIMO rate may vary among different signals transmitted in the MIMO system. For example, a MIMO rate of an initial $0^{th}$ transmission may differ from a MIMO rate of a $1^{st}$ retransmission and/or a $2^{nd}$ retransmission. Moreover, the MIMO rate of the $1^{st}$ retransmission may differ from the MIMO rate of the $2^{nd}$ retransmission.

At 1114 the receiver may receive a retransmission from the transmitter. The transmitter may use the feedback to determine which MIMO mode to use for the retransmission. At 1116, the receiver may correct the original signal using the retransmission. Process 1100 may loop back such that the receiver may then run a CRC check on the corrected signal at 1106.

There are several MIMO modes that the transmitter can switch among after receiving the feedback from the receiver. For example, there may be a switch from closed-loop MIMO to open loop MIMO and vice-versa. In another example, there may be a switch from multi-user MIMO to single-user MIMO or vice versa. This switch may occur if only one user receives a NACK in connection with a $0^{th}$ initial transmission. In another example, there may be a switch from a non-cooperative MIMO mode to a cooperative MIMO mode and vice versa. The cooperative MIMO mode is when multiple transmitters transmit different signals to the same receiver. The non-cooperative MIMO mode is when one transmitter transmits a signal to one or more receivers. The cooperative MIMO mode improves channel conditions and allows for a different kind of diversity called macro-diversity. Accordingly, this may enable reliability to be enhanced by macro-diversity. In another example, there may be a switch from non-cyclic delay diversity (non-CDD) MIMO to CDD MIMO, which may utilize frequency diversity. Frequency diversity is when different signals on different channels have different delays. From a frequency point of view, these different delays cause a higher fluctuation in the frequency response. This higher fluctuation corresponds to frequency diversity. Disclosed embodiments may switch between any combinations of the modes disclosed herein.

Moreover, in disclosed embodiments, the retransmitted signal may be sent at an increased or decrease code rate, whether in SM mode, STBC mode, or SFBC mode.

Figure 12:
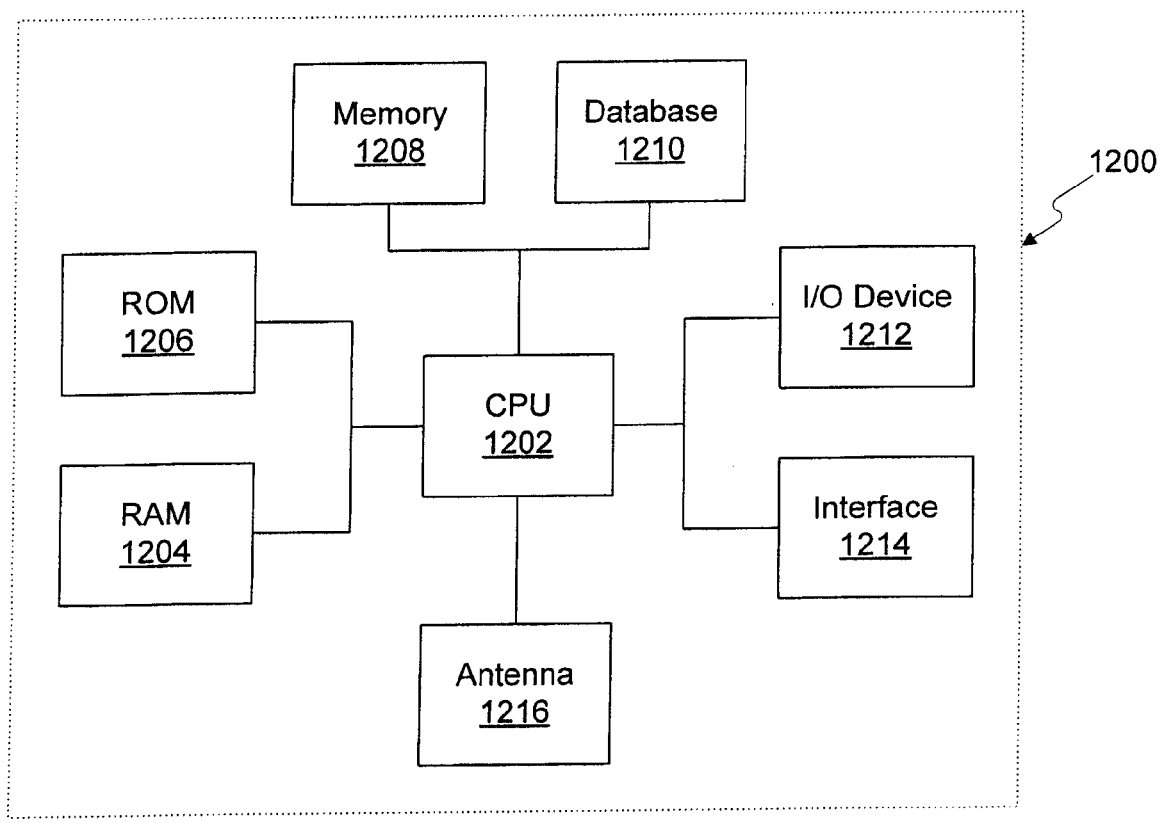
FIG. 12 is a block diagram of an exemplary hardware component.

With reference to FIG. 12, each component described herein, e.g., MIMO transmitter 104 and MIMO receiver 106, may be implemented as a host 1200 including one or more of the following components: at least one central processing unit (CPU) 1202 configured to execute computer program instructions to perform various processes and methods, random access memory (RAM) 1204 and read only memory (ROM) 1206 configured to access and store information and computer program instructions, memory 1208 to store data and information, one or more databases 1210 to store tables, lists, or other data structures, one or more I/O devices 1212, one or more interfaces 1214, one or more antennas 1216, etc. Each of these components is well-known in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a multiple input multiple output (MIMO) wireless communication system, a method for error correction, comprising:
receiving an original signal in an initial MIMO format;
detecting an error in the original signal;
notifying a transmitter of the error detected in the original signal;
receiving a new retransmitted signal in a first retransmitted MIMO format, different from the initial MIMO format, the new retransmitted signal including at least a fraction of encoded bits of the original signal;
correcting the original signal by applying the new retransmitted signal to the original signal;
sending feedback about the original signal to transmitter, wherein the transmitter switches the first retransmitted MIMO format from the initial MIMO format according to the sent feedback,
wherein the initial MIMO format and the first MIMO format are chosen from the group including: closed-loop MIMO, open-loop MIMO, multi-user MIMO, single-user MIMO, non-cooperative MIMO, cooperative MIMO, non-CDD MIMO, CDD MIMO, or a combination thereof, and wherein the initial MIMO format and the first retransmitted MIMO format have a different MIMO rate.

2. The method of claim 1, further comprising:
subtracting, from the original signal, a portion of the new retransmitted signal to obtain a first degenerated signal;
subtracting, from the original signal, the first degenerated signal to obtain a second degenerated signal;
soft combining the portion of the new retransmitted signal with the second degenerated signal to correct the error n the original signal.

3. The method of claim 2, further comprising;
applying Maximum Ratio Combining (MRC) to obtain soft information for the soft combining.

4. The method of claim 1, wherein the initial MIMO format or the first retransmitted MIMO format comprise one or more of Spatial Multiplexing (SM), Space Time Block Coding (STBC) Space Frequency Block Coding (SFBC), open-loop MIMO, closed-loop MIMO, single-user MIMO, multi-user MIMO, cyclic delay diversity (CDD), or cooperative MIMO.

5. The method of claim 1, further comprising:
receiving a former retransmitted signal in a second retransmitted MIMO format, before receiving the new retransmitted signal;
forming a combined signal by combining the former retransmitted signal with the original signal to attempt to correct the error of the original signal;
detecting an error in the combined signal; and
notifying the transmitter of the error detected in the combined signal,
wherein the correcting further comprises applying the new retransmitted signal to the combined signal.

6. The method of claim 5, wherein:
at least one of the new retransmitted signal or the former retransmitted signal include a multiple of the encoded bits of the original signal;
a constellation order of the new retransmitted signal is different from a constellation order of the former retransmitted signal; and
a MIMO rate of the new retransmitted signal is different than a MIMO rate of the former retransmitted signal.

7. The method of claim 1, further comprising:
determining the new retransmitted MIMO format according to one or more of a NACK signal or channel quality information, the channel quality information describing one or more of carrier to interference noise ratio (CINR), rank, or a correlation matrix.

8. The method of claim 6, wherein at least one of the first retransmitted MIMO format, the second retransmitted MIMO format, the MIMO rate of the new retransmitted signal, the MIMO rate of the former retransmitted signal, or the constellation order is determined dynamically or is predefined.

9. The method of claim 1, further comprising:
encoding input data at the transmitter according to forward error correction (FEC), the encoded data including systematic encoded bits and parity encoded bits;
identifying an encoded subset of the systematic encoded bits and the parity encoded bits according to at least the first retransmitted MIMO format; and
selecting the encoded subset to obtain the new retransmitted signal.

10. At least one computer-readable medium including program instructions which, when executed by at least one processor, cause the at least one processor to perform a method for error correction in a multiple input multiple output (MIMO) wireless communication system, the method comprising:
receiving an original signal in an initial MIMO format;
detecting an error in the original signal;
notifying a transmitter of the error detected in the original signal;
receiving a new retransmitted signal in a first retransmitted MIMO format, different from the initial MIMO format, the new retransmitted signal including at least a fraction of encoded bits of the original signal;
correcting the original signal by applying the new retransmitted signal to the original signal;
sending feedback about the original signal to the transmitter,
wherein the transmitter switches to the first retransmitted MIMO format from the original MIMO format according to the sent feedback,
wherein the original MIMO format and the first retransmitted, MIMO format are chosen from the group including: closed-loop MIMO, open-loop MIMO, multi-user MIMO, single-user MIMO, non-cooperative MIMO, cooperative MIMO, non-CDD MIMO, or CDD MIMO, and
wherein the initial MIMO format and the first retransmitted MIMO format have a different MIMO rate.

11. The computer-readable medium of claim 10, the method further comprising:
subtracting, from the original signal, a portion of the new retransmitted signal to obtain a first degenerated signal;
subtracting, from the original signal, the first degenerated signal to obtain a second degenerated signal;
soft combining the portion of the new retransmitted signal with the second degenerated signal to correct the error in the original signal.

12. The computer-readable medium of claim 11, further comprising:
applying Maximum Ratio Combining (MRC) to obtain soft information for the soft combining.

13. The computer-readable medium of claim 10, wherein the initial MIMO format or the first retransmitted MIMO format comprise one or more of Spatial Multiplexing (SM), Space Time Block Coding (STBC) or Space Frequency Block Coding (SFBC), open-loop MIMO, closed-loop MIMO, single-user MIMO, multi-user MIMO, cyclic delay diversity (CDD), or cooperative MIMO.

14. The computer-readable medium of claim 10, the method further comprising:
receiving a former retransmitted signal in a second retransmitted MIMO format, before receiving the new retransmitted signal;
forming a combined signal by combining the former retransmitted signal with the original signal to attempt to correct the error of the original signal;
detecting an error in the combined signal; and
notifying the transmitter of the error detected in the combined signal,
wherein the correcting further comprises applying the new retransmitted signal to the combined signal.

15. The computer-readable medium of claim 14, wherein:
at least one of the new retransmitted signal or the former retransmitted signal include a multiple of the encoded bits of the original signal;
a constellation order of the new retransmitted signal is different from a constellation order of the former retransmitted signal; and a MIMO rate of the new retransmitted signal is different from a MIMO rate of the former retransmitted signal.

16. The computer-readable medium of claim 10, the method further comprising:
determining the new retransmitted MIMO format according to one or more of a NACK signal or channel quality information, the channel quality information describing one or more of carrier to interference noise ratio (CINR), rank, or a correlation matrix.

17. The computer-readable medium of claim 15, wherein at least one of the first retransmitted MIMO format, the second retransmitted MIMO format, the MIMO rate of the new retransmitted signal, the MIMO rate of the former retransmitted signal, or the constellation order is determined dynamically or is predefined.

18. The computer-readable medium of claim 10, further comprising:
encoding input data at the transmitter according to forward error correction (FEC), the encoded data including systematic encoded bits and parity encoded bits;
identifying an encoded subset of the systematic encoded bits and the parity encoded bits according to at least the first retransmitted MIMO format; and
selecting the encoded subset to obtain the new retransmitted signal.

19. A multiple input multiple output (MIMO) wireless communication system for error correction, the system comprising:
antennae configured to receive an original signal in an initial MIMO format, notify a transmitter of an error in the original signal, and receive a new retransmitted signal in a first retransmitted MIMO format different from the initial MIMO format, the new retransmitted signal including at least a fraction of encoded bits of the original signal;
a processor configured to detect the error in the original signal and to correct the original signal by applying the new retransmitted signal to the original signal;
wherein:
the processor is configured to send feedback about the original/former retransmitted signal to the transmitter;
the transmitter is configured to switch to the first retransmitted MIMO format from the initial MIMO format according to the sent feedback; and
the transmitter is configured to chose the initial MIMO format and the first retransmitted MIMO format from the group including: closed-loop MIMO, open-loop MIMO, multi-user MIMO, single-user MIMO, non-cooperative MIMO, cooperative MIMO, non-CDD MIMO, CDD MIMO, or a combination thereof, and
wherein the initial format and the first retransmitted MIMO format have a different MIMO rate.

20. The system of claim 19, wherein the processor comprises:
means for subtracting, from the original signal, a portion of the new retransmitted signal to obtain a first degenerated signal;
means for subtracting, from the original signal, the first degenerated signal to obtain a second degenerated signal;
means for soft combining the portion of the new retransmitted signal with the second degenerated signal to correct the error in the original signal.

21. The system of claim 20, wherein the processor is configured to apply Maximum Ratio Combining (MRC) to obtain soft information for the means for soft combining.

22. The system of claim 19, wherein the initial MIMO format or the first retransmitted MIMO format comprise one or more of Spatial Multiplexing (SM), Space Time Block Coding (STBC) or Space Frequency Block Coding (SFBC), open-loop MIMO, closed-loop MIMO, single-user MIMO, multi-user MIMO, cyclic delay diversity (CDD), or cooperative MIMO.

23. The system of claim 19, wherein:
the antennae are configured to:
receive a former retransmitted signal in a second retransmitted MIMO format, before receiving the new retransmitted signal, and
notify the transmitter of an error detected in the combined signal; and the processor is configured to:
form a combined signal by combining the former retransmitted signal with the original signal to attempt to correct the error of the original signal;
detect the error in the combined signal; and
notify the transmitter of the error detected in the combined signal,
wherein the correcting further comprises applying the new retransmitted signal to the combined signal.

24. The system of claim 23, wherein:
at least one of the new retransmitted signal or the former retransmitted signal include a multiple of the encoded bits of the original signal; and
a constellation order of the new retransmitted signal is different from a constellation order of the former retransmitted signal; and
a MIMO rate of the new retransmitted signal is different from a MIMO rate of the former retransmitted signal.

25. The system of claim 19, wherein the processor is configured to determine the new retransmitted MIMO format according to one or more of a NACK signal and channel quality information, the channel quality information describing one or more of carrier to interference noise ratio (CINR), rank, or a correlation matrix.

26. The system of claim 24, wherein at least one of the first retransmitted MIMO format, the second retransmitted MIND format, the MIMO rate of the new retransmitted signal, the MIMO rate of the former retransmitted signal, or the constellation order is determined dynamically or is predefined.

27. The system of claim 19, wherein the transmitter comprises:
means for encoding input data according to forward error correction (FEC), the encoded data including a systematic encoded bits and parity encoded bits;
means for identifying an encoded subset of the systematic encoded bits and the parity encoded bits according to at least the first retransmitted MIMO format; and
means for selecting the encoded subset to obtain the new retransmitted signal.

* * * * *